(12) United States Patent
Sodi et al.

(10) Patent No.: US 11,910,168 B2
(45) Date of Patent: Feb. 20, 2024

(54) METHOD OF GROUPING PIECES OF EQUIPMENT TOGETHER BY SOUND SPACE

(71) Applicant: SAGEMCOM BROADBAND SAS, Rueil Malmaison (FR)

(72) Inventors: Frédéric Sodi, Rueil Malmaison (FR); Vincent Schott, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 293 days.

(21) Appl. No.: 17/071,524

(22) Filed: Oct. 15, 2020

(65) Prior Publication Data

US 2021/0120350 A1 Apr. 22, 2021

(30) Foreign Application Priority Data

Oct. 17, 2019 (FR) ...................................... 19 11587

(51) Int. Cl.
*H04R 29/00* (2006.01)

(52) U.S. Cl.
CPC .................................. *H04R 29/001* (2013.01)

(58) Field of Classification Search
CPC ........................... H04R 29/001; H04R 29/007; H04R 2420/07; G06F 5/01; G06F 11/1633; G06F 11/182; H04L 63/0869
USPC ....... 381/58, 77, 56, 150, 122, 59; 73/570.5, 73/570; 702/1, 108, 127; 248/406.1; 708/205; 704/501, 504; 701/30.6; 713/169
See application file for complete search history.

(56) References Cited

U.S. PATENT DOCUMENTS

| | | | | |
|---|---|---|---|---|
| 10,289,377 B2 * | 5/2019 | Wu | ........................ | G01H 11/06 |
| 10,986,460 B2 * | 4/2021 | Reilly | ..................... | G06F 3/165 |
| 2003/0188005 A1 * | 10/2003 | Yoneda | ................... | H04L 65/70 709/231 |
| 2007/0112942 A1 * | 5/2007 | Moquin | .............. | H04L 12/2809 370/254 |
| 2009/0003613 A1 | 1/2009 | Christensen | | |
| 2022/0059120 A1 * | 2/2022 | Yamamoto | .............. | G10L 25/51 |

FOREIGN PATENT DOCUMENTS

KR 10-1985782 B1 6/2019
WO WO 2006/131894 A2 12/2006

* cited by examiner

Primary Examiner — Vivian C Chin
Assistant Examiner — Con P Tran
(74) Attorney, Agent, or Firm — MUNCY, GEISSLER, OLDS & LOWE, P.C.

(57) ABSTRACT

A method of grouping together pieces of equipment that are capable of emitting sound signals, the method comprising the steps of: causing each piece of equipment to emit a test sound signal; causing the test sound signal to be received by each piece of equipment that is capable of receiving sound signals, and causing each of these pieces of equipment to evaluate a recognition level for said test sound signal; or each pair of pieces of equipment Ei and Ej, evaluating a mutual recognition level representative both of a recognition level N(i, j) for the piece of equipment Ei receiving a test sound signal emitted by the piece of equipment Ej, and also of a recognition level N(j, i); on the basis of the mutual recognition level, determining whether or not the pieces of equipment Ei and Ej belong to a common sound space.

17 Claims, 3 Drawing Sheets

Fig. 3

| V(j,i) \ V(i,j) | Defined | Undefined |
|---|---|---|
| Defined | S(i,j) = Weighted sum of V(i,j) & V(j,i) | S(i,j) = V(i,j) & S(j,i) = 0 |
| Undefined | S(i,j) = 0 & S(j,i) = V(j,i) | S(i,j) = 0 & S(j,i) = 0 |

METHOD OF GROUPING PIECES OF EQUIPMENT TOGETHER BY SOUND SPACE

The invention relates to the field of installations comprising pieces of equipment such as decoder boxes and audio playback equipment.

BACKGROUND OF THE INVENTION

Certain homes have a plurality of decoder boxes (also known as "set-top boxes" (STBs)) and a plurality of pieces of audio playback equipment. The term "piece of audio playback equipment" is used herein to mean any piece of equipment having at least one loudspeaker: a smart speaker, a sound bar, etc. The decoder boxes and the pieces of audio playback equipment are connected together by a common network (e.g. an Ethernet or a Wi-Fi network).

Each room in the home may contain a decoder box and a plurality of pieces of audio playback equipment. A room constitutes a "sound space".

It is envisaged that the decoder box and the pieces of audio playback equipment occupying a common sound space should be grouped together automatically within a common group. Specifically, such automatic grouping together makes it possible to implement a certain number of functions.

For the decoder box of a group, a first example of a function consists in transmitting the audio signal of a film to the pieces of audio playback equipment of that group and to a television situated in the sound space associated with the group. The decoder box also transmits the video signal of the film to the television.

For a decoder box, a second example of a function consists in transmitting the audio signal of a film to the pieces of audio playback equipment of another group via the decoder box of that other group.

A third example of a function consists in using the grouping together to define a particular piece of audio playback equipment that is to respond to a voice request from the user.

A fourth example of a function consists in causing all of the microphones present in a common sound space, and thus belonging to the same group, to co-operate with one another in order to analyze a user's voice request collectively.

Automatic grouping together by sound spaces is thus very advantageous.

Prior art methods are known for automatically grouping pieces of equipment together.

Among such known methods, there are to be found in particular methods in which the pieces of equipment exchange messages containing their locations with one another. There are also methods in which a piece of equipment is located by means of reference pieces of equipment in known positions emitting signals (which may be radio signals or sound signals).

Thus, in those prior art methods, in order to group pieces of equipment together, it is necessary to know either the positions of all of the pieces of equipment, or else the positions of at least a plurality of reference pieces of equipment.

OBJECT OF THE INVENTION

An object of the invention is to group pieces of equipment that are capable of emitting signals together by sound spaces, and to do so in a manner that is simple and effective, without it being necessary to know the position of any of these pieces of equipment.

SUMMARY OF THE INVENTION

In order to achieve this object, there is provided a grouping method for grouping pieces of equipment that are capable of emitting sound signals together by sound spaces, the method including an operational stage comprising the steps of:

causing each piece of equipment to emit a test sound signal in succession;

causing the test sound signal to be received by each piece of equipment that is capable of receiving sound signals, and causing each of these pieces of equipment to evaluate a recognition level for said test sound signal;

for each pair of pieces of equipment $E_i$ and $E_j$, evaluating a mutual recognition level representative both of a recognition level $N(i, j)$ for the piece of equipment $E_i$ receiving a test sound signal emitted by the piece of equipment $E_j$, and also of a recognition level $N(j, i)$ for the piece of equipment $E_j$ receiving a test sound signal emitted by the piece of equipment $E_i$;

on the basis of the mutual recognition level, determining whether or not the pieces of equipment $E_i$ and $E_j$ belong to a common sound space.

The pieces of equipment are thus grouped together by some or all of the pieces of equipment emitting test sound signals, and by some or all of these pieces of equipment receiving and analyzing said test sound signals.

The method of the invention for grouping together by sound spaces is very effective, since it makes use specifically of sound signals and not of signals of some other type (e.g. radio signals) that might indeed be effective for determining the three-dimensional proximity of the pieces of equipment but not for evaluating precisely their reciprocal "sound visibilities" and thus whether or not they belong to common sound spaces. The grouping method does not require knowledge of the positions of the pieces of equipment. Furthermore, the grouping method is simple and inexpensive to implement, since it does not require any additional hardware resources.

There is also provided a grouping method as described above, wherein the pieces of equipment comprise pieces of decoder equipment and pieces of audio playback equipment.

There is also provided a grouping method as described above, further including a preliminary stage comprising the step of defining a master piece of equipment from among the pieces of equipment, with the operational stage being controlled by the master piece of equipment.

There is also provided a grouping method as described above, wherein the master piece of equipment is a piece of decoder equipment.

There is also provided a grouping method as described above, wherein the operational stage comprises, for each piece of equipment $E_i$ capable of receiving sound signals, steps of emitting and receiving a test sound signal, and a step of said piece of equipment $E_i$ evaluating a self-recognition level $N(i, i)$ for said test sound signal, the operational stage further comprising, for each pair of pieces of equipment $E_i$ and $E_j$, steps of the piece of equipment $E_i$ defining a normalized recognition level $V(i, j)$ for a test sound signal emitted by the piece of equipment $E_j$, such that:

$$V(i,j)=N(i,j)/N(i,i).$$

There is also provided a grouping method as described above, wherein the mutual recognition level S(i, j) is such that:

$$S(i,j) = \alpha \times V(i,j) + \beta \times V(j,i),$$

with $\alpha + \beta = 1$.

There is also provided a grouping method as described above, wherein, for a pair of pieces of equipment Ei and Ej in which the piece of equipment Ei is not capable of receiving sound signals, the following applies:

$$S(i,j) = 0 \text{ and } S(j,i) = V(j,i).$$

There is also provided a grouping method as described above, wherein, for a pair of pieces of equipment Ei and Ej that are both incapable of receiving sound signals, the following applies:

$$S(i,j) = 0 \text{ and } S(j,i) = 0.$$

There are also provided a grouping method as described above, wherein it is determined that the piece of equipment Ei recognizes the piece of equipment Ej, and thus that the pieces of equipment Ei and Ej belong to a common primary group, when:

S(i, j)>Sr, where Sr is a predetermined recognition threshold.

There is also provided a grouping method as described above, wherein, within a common primary group, it is considered that a recognition link l(i, j) exists between two pieces of equipment Ei and Ej when the piece of equipment Ei recognizes the piece of equipment Ej, and wherein it is considered that the primary group is a finalized group and corresponds to a common sound space when the number of recognition links existing in the primary group is equal to a maximum number of links Lmax such that:

$$L\max = (n - ns) \times (n - 1);$$

where n is the number of pieces of equipment in the primary group and where ns is the number of pieces of equipment among the n pieces that are incapable of receiving sound signals.

There are also provided a grouping method as described above, comprising the step, when the number of recognition links existing in the primary group is less than the maximum number of links Lmax, of presenting the primary group to a user and of requesting the user to decide whether or not the primary group is a finalized group.

There is also provided a grouping method as described above, comprising the step, when the number of recognition links existing in the primary group is less than the maximum number of links Lmax, of comparing the number of existing links with a predetermined link threshold, and of considering that the primary group is a finalized group if the number of existing recognition links is greater than or equal to the predetermined link threshold.

There is also provided a grouping method as described above, further comprising the step, when the number of recognition links existing in the primary group is less than the maximum number of links Lmax, of reiterating the operational stage while modifying the test sound signal and/or while modifying a method used for analyzing the test sound signal for the purpose of evaluating the recognition level of said test sound signal.

There is also provided a grouping method as described above, further comprising the step of allocating a particular function to the pieces of equipment that occupy a common sound space.

There is also provided a piece of equipment including at least one processor component arranged to perform the operational stage of the grouping method as described above.

There is also provided a piece of equipment as described above, comprising a piece of decoder equipment.

There are also provided a computer program including instructions that cause the processor component of the piece of equipment as described above to execute the steps of the operational stage of the above-described grouping method.

There is also provided a computer readable storage medium, having recorded thereon the computer program as described above. The invention can be better understood in the light of the following description of a particular, non-limiting embodiment of the invention.

BRIEF DESCRIPTION OF THE DRAWINGS

Reference is made to the accompanying drawings, in which:

FIG. 3 shows a truth table suitable for use in calculating normalized recognition levels.

DETAILED DESCRIPTION OF THE INVENTION

Figure 1:
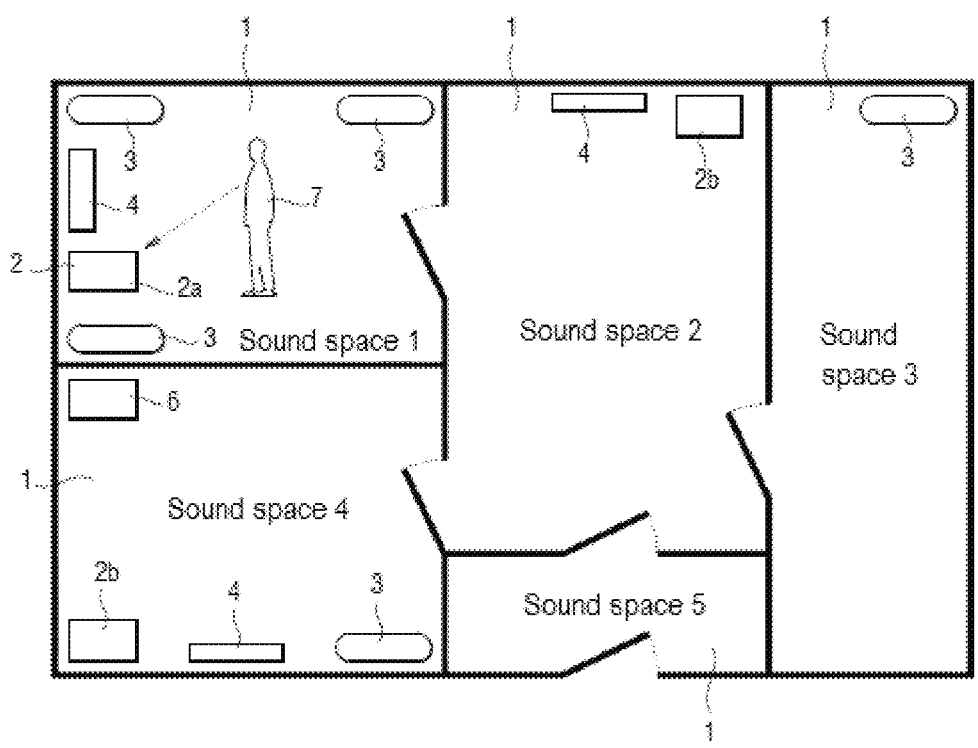
FIG. 1 shows a home having a plurality of sound spaces.

With reference to FIG. 1, in this example, the grouping method of the invention is for grouping together by sound spaces 1 pieces of equipment that comprise pieces of decoder equipment, specifically decoder boxes 2 (also known as set-top boxes (STBs)), and pieces of audio playback equipment 3. In this example, the sound spaces 1 correspond to distinct rooms of a home. The home also includes televisions 4. Each decoder box 2 is connected to a distinct television 4. The home also includes a gateway 6.

The decoder boxes 2 and the pieces of audio playback equipment 3 are connected together by a common network (e.g. an Ethernet or a Wi-Fi network).

The decoder boxes 2 can communicate over the network with the pieces of audio playback equipment 3. In this example, it is not necessary for the pieces of audio playback equipment 3 to be capable of communicating with one another.

The decoder boxes 2 receive audio signals and video signals coming from various sources (satellite, cable, Internet protocol (IP), digital terrestrial television (DTT), etc.). The decoder boxes 2 serve in particular to process the audio signals and the video signals and to transmit them to the pieces of audio playback equipment 3 and to the televisions 4. The pieces of audio playback equipment 3 play back the audio signals by generating sound signals.

In this example, it is assumed that the decoder boxes 2 are capable of emitting sound signals, but not of receiving them. In order to emit sound signals, each decoder box 2 uses the loudspeakers of the television 4 to which it is connected.

In this example, each decoder box 2 is connected to a television 4 via a high definition multimedia interface (HDMI) link. It would be possible to use any other physical link suitable for connecting a decoder box to a television and capable of transporting a video and/or audio signal. It is (naturally) assumed that the pieces of audio playback equipment 3 are capable of emitting sound signals, and it is also assumed that the pieces of audio playback equipment 3 are capable of receiving sound signals. In order to receive sound signals, each piece of audio playback equipment 3 includes one or more microphones.

Each piece of equipment on the network is correctly identified together with its capabilities, e.g. by means of a Zeroconf protocol of the Bonjour or Avahi type.

Figure 2:
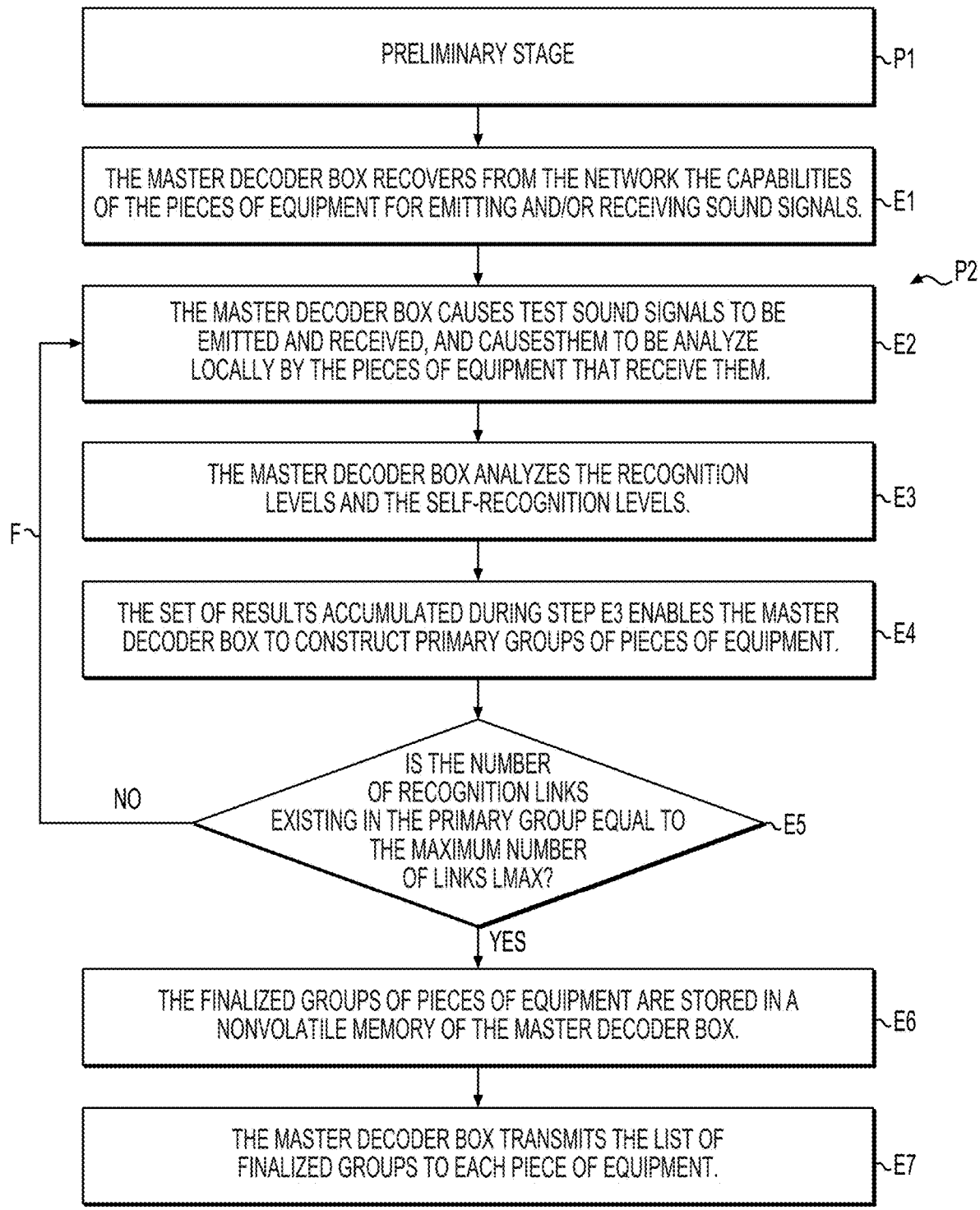
FIG. 2 shows steps of the grouping method of the invention.

With reference to FIG. 2, the grouping method comprises firstly a preliminary stage (stage P1), during which a master decoder box 2a is defined from among the decoder boxes 2. The other decoder boxes 2b are then considered as being slave decoder boxes.

In this example, the master decoder box 2a is the box that is being used by a user 7.

Thereafter, the grouping method comprises an operational stage (stage P2) that is controlled by a processor component of the master decoder box 2a. The processor component includes a software module and it is adapted to execute instructions of a program in order to perform this operational stage.

By way of example, the processor component comprises a microcontroller, a processor, a field programmable gate array (FPGA), etc.

The master decoder box 2a recovers from the network the capabilities of the pieces of equipment for emitting and/or receiving sound signals: step E1.

The master decoder box 2a then causes test sound signals to be emitted and received, and also causes them to be analyzed locally by the pieces of equipment that receive them: step E2.

More precisely, the master decoder box 2a causes a test sound signal to be emitted in succession by each piece of equipment capable of emitting sound signals, i.e. in this example by the decoder boxes 2 and by the pieces of audio playback equipment 3. For each of these "emitter" pieces of equipment, the emitted level of the test sound signal is a default level. The default level may be a constant value, e.g. equal to 25% of the maximum sound level of the piece of equipment. The default level may also be a value that is set by the user. In this example, the test sound signal is a pattern of varying amplitude and/or of varying frequency.

For each piece of equipment capable of receiving sound signals, i.e. in this example for each of the pieces of audio equipment 3, the master decoder box 2a causes test sound signals to be received, analyzed, and recorded. This step takes place at the same time as emission: the pieces of equipment that are not emitting are already listening.

Thus, when an "emitter" piece of equipment emits a test sound signal, all of the other pieces of equipment capable of receiving sound signals (i.e. "receiver" pieces of equipment) receive said test sound signal (either simultaneously or in succession).

Each piece of equipment Ei that receives a test sound signal emitted by a piece of equipment Ej produces a recognition level N(i, j) for that test sound signal. The recognition level may be obtained by various recognition methods: cross correlation between the emitted test sound signal and the received test sound signal, frequency filtering and amplitude measurement, demodulation and amplitude measurement, etc. This processing is local processing performed locally by each piece of equipment Ei.

Each piece of equipment Ei that is capable of emitting and receiving sound signals then emits and then receives a test sound signal, and evaluates a self-recognition level N(i, i) for said test signal. For any piece of equipment, the self-recognition level thus evaluates its own recognition of a received test sound signal that it has itself emitted. This processing is local processing performed locally by each piece of equipment Ei.

All of the pieces of equipment then transmit to the master decoder box 2a the recognition levels N(i, j) and the self-recognition levels N(i, i).

The master decoder box 2a then analyzes the recognition levels and the self-recognition levels (step E3).

More precisely, for each pair of pieces of equipment Ei and Ej, the master decoder box 2a defines a normalized recognition level V(i, j) for the piece of equipment Ei of a test sound signal emitted by the piece of equipment Ej, such that:

$$V(i,j)=N(i,j)/N(i,i).$$

In the event that a piece of equipment Ei is not capable of receiving sound signals, the normalized recognition level V(i, j) is "undefined".

Thereafter, for each pair of pieces of equipment Ei and Ej, the master decoder box 2a evaluates a mutual recognition level S(i, j) representative of a recognition level N(i, j) for the piece of equipment Ei receiving a test sound signal emitted by the piece of equipment Ej, and of a recognition level N(j, i) for the piece of equipment Ej receiving a test sound signal emitted by the piece of equipment Ei.

The mutual recognition level S(i, j) is equal to a weighted sum of the normalized recognition level V(i, j) plus the normalized recognition level V(j, i):

$$S(i,j)=\alpha \times V(i,j)+\beta \times V(j,i),$$

with $\alpha+\beta=1$.

For example, it is possible to have $\alpha=0.5$ and $\beta=0.5$, so that the mutual recognition level S(i, j) is the average of the two normalized recognition levels.

When the normalized recognition level V(i, j) and/or the normalized recognition level V(j, i) is/are undefined, the mutual recognition level S(i, j) is calculated using the table of FIG. 3.

Thus, for a pair of pieces of equipment Ei and Ej in which the piece of equipment Ei is not capable of receiving sound signals, the following applies:

$$S(i,j)=0 \text{ and } S(j,i)=V(j,i).$$

For a pair of pieces of equipment Ei and Ej that are both incapable of receiving sound signals, the following applies:

$$S(i,j)=0.$$

Thereafter, the master decoder box 2a determines that a piece of equipment Ei recognizes a piece of equipment Ej when the mutual recognition level S(i, j) is greater than a predetermined recognition threshold Sr, i.e. if:

$$S(i,j)>Sr.$$

By way of example, the predetermined recognition threshold Sr is equal to 0.75; S(i, j) having a value equal to 1 corresponds to theoretically perfect mutual recognition between the pieces of equipment Ei and Ej.

The set of results accumulated during the step E3 enables the master decoder box 2a to construct primary groups of pieces of equipment (step E4).

The master decoder box 2a determines that the piece of equipment Ei and the piece of equipment Ej belong to the same primary group when the piece of equipment Ei recognizes the piece of equipment Ej (i.e. when S(i, j)>Sr), or else when the piece of equipment Ej recognizes the piece of equipment Ei (i.e. when S(j, i)>Sr).

A primary group is thus defined as soon as a unidirectional recognition link exists between two pieces of equipment.

Within a given primary group, it is considered that a recognition link l(i, j) exists between a piece of equipment Ei and a piece of equipment Ej when the piece of equipment Ei recognizes the piece of equipment Ej.

For each primary group, the master decoder box 2a then determines the number of recognition links that exist.

Thereafter, for each primary group, the master decoder box 2a compares the number of existing recognition links with a maximum number of links Lmax:

$$L\ max=(n-ns)\times(n-1),$$

where n is the number of pieces of equipment in the primary group and where ns is the number of pieces of equipment among the n pieces that are incapable of receiving sound signals (step E5).

If the number of recognition links existing in the primary group is equal to the maximum number of links Lmax, then all of the pieces of equipment in the primary group recognize all of the others reciprocally. Under such circumstances, the master decoder box 2a considers that the primary group is a finalized group that does indeed correspond to a single sound space.

The result is then presented to the user 7 for confirmation or correction. The finalized groups of pieces of equipment are stored in a nonvolatile memory of the master decoder box 2a (step E6).

In contrast, during the step E5, when the number of links existing in a primary group is less than the maximum number of links Lmax, then several solutions are possible.

A first solution consists in presenting the primary group to the user and in asking the user to decide whether or not the primary group is a finalized group that does indeed correspond to a single sound space.

A second solution consists in comparing the number of existing recognition links with a predetermined link threshold Sl, and in considering automatically that the primary group is a finalized group if the number of existing recognition links is greater than or equal to the predetermined link threshold Sl.

By way of example, the predetermined link threshold may be such that:

$$Sl=0.75\times L\ max.$$

If the number of existing recognition links is greater than or equal to the predetermined link threshold, the primary group is considered as being a finalized group, in spite of the fact that some recognition links are missing.

When the number of existing recognition links is less than the predetermined link threshold, the primary group is presented to the user, and the user decides whether or not the primary group is a finalized group that does indeed correspond to a single sound space.

A third solution consists in reiterating the operational stage P2 by returning to step E2 (see arrow F in FIG. 2) and modifying the test sound signal and/or using some other method for recognizing the received test sound signal. An attempt is then made to re-evaluate the missing links.

After step E6, the master decoder box 2a transmits the list of finalized groups to each piece of equipment (step E7).

All of the decoder boxes 2 are then at the same level: there is no longer a master decoder box nor any slave decoder boxes. Each decoder box 2 can manage its finalized group in independent manner.

The user may allocate one or more functions to each finalized group, and for example one or more of the first function, the second function, the third function, and the fourth function, as described above.

It should be observed that, if the user 7 changes the room of a piece of equipment, the operational stage P2 of the grouping method needs to be repeated.

It should also be observed that it is possible to consider that all of the pieces of equipment that are not manufactured by some particular manufacturer are to be considered in the same manner as the slave decoder boxes 2b.

It should also be observed that, in the above description, all of the pieces of equipment mentioned are capable of emitting sound signals. Pieces of equipment that are not capable of emitting sound signal are identified and they are presented to the user at the same time as the list of finalized groups. It is then the user who decides whether these pieces of equipment are be integrated in the finalized groups.

Naturally, the invention is not limited to the embodiment described, but covers any variant coming within the ambit of the invention as defined by the claims.

In the above description, the decoder boxes are capable of emitting sound signals, but they are not capable of receiving them.

Naturally, it is entirely possible for the decoder boxes to be capable of receiving sound signals, thereby enabling them to be given a genuine normalized recognition level V(i, j) rather than an undefined recognition level V(i, j). The decoder boxes may thus be provided with respective microphones, or they may be connected to respective microphones, e.g. to a microphone present in a remote control (e.g. of Bluetooth type). For a remote control having a microphone, it is the remote control controlling the master decoder box during configuration that needs to be used (since it is necessarily situated in the same room as the master decoder box).

The user is described as being capable of allocating one or more functions to each finalized group. This allocation may also be performed automatically, e.g. by the master decoder box or indeed by each decoder box for its own finalized group.

The sound spaces are not necessarily different rooms, but could for example be different areas within a single "room" of large size (e.g. an open space).

The pieces of decoder equipment need not necessarily be decoder boxes (or STBs), but could be other pieces of equipment capable of performing audio, video, audio/video decoding, e.g. a game console, a computer, a smart-TV, etc.

More generally, the invention need not necessarily be performed with pieces of decoder equipment or with pieces of audio playback equipment, but could be performed using any type of equipment capable of emitting sound signals.

The invention claimed is:

1. A grouping method for grouping pieces of equipment that are capable of emitting sound signals together by sound spaces by using a decoder connected to the pieces of equipment via a network, the method including an operational stage comprising the steps of:
   emitting a test sound signal in succession by a speaker of each piece of equipment;
   receiving the test sound signal by a microphone of each piece of equipment that is capable of receiving sound signals;
   evaluating, by the decoder, a recognition level for said received test sound signal by each of the pieces of equipment that is capable of receiving sound signals;
   for each pair of pieces of equipment Ei and Ej, evaluating, by the decoder, a mutual recognition level representative both of a recognition level N(i, j) for the piece of equipment Ei receiving a test sound signal emitted by the piece of equipment Ej, and also of a recognition level N(j, i) for the piece of equipment Ej receiving a test sound signal emitted by the piece of equipment Ei; and on the basis of the mutual recognition level, determining, by the decoder, whether or not the pieces of equipment Ei and Ej belong to a common sound space, without information related to positions of the pieces of equipment Ei and Ej; and grouping, by the decoder the pieces of equipment Ei and Ej if it is determined that the pieces of equipment Ei and Ej belong to the common sound space.

2. The grouping method according to claim 1, wherein the pieces of equipment comprise pieces of decoder equipment and pieces of audio playback equipment.

3. The grouping method according to claim 1, further including a preliminary stage comprising the step of defining a master piece of equipment from among the pieces of equipment, with the operational stage being controlled by the master piece of equipment.

4. The grouping method according to claim 3, wherein the master piece of equipment is a piece of decoder equipment.

5. The grouping method according to claim 1, wherein the operational stage comprises, for each piece of equipment Ei capable of receiving sound signals, steps of emitting and receiving a test sound signal, and a step of said piece of equipment Ei evaluating a self-recognition level N(i, i) for said test sound signal, the operational stage further comprising, for each pair of pieces of equipment Ei and Ej, steps of the piece of equipment Ei defining a normalized recognition level V(i, j) for a test sound signal emitted by the piece of equipment Ej, such that:

$$V(i,j)=N(i,j)/N(i,i).$$

6. The grouping method according to claim 5, wherein the mutual recognition level S(i, j) is such that:

$$S(i,j)=\alpha \times V(i,j) \beta \times V(j,i),$$

with $\alpha+\beta=1$.

7. The grouping method according to claim 6, wherein, for a pair of pieces of equipment Ei and Ej in which the piece of equipment Ei is not capable of receiving sound signals, the following applies:

$$S(i,j)=0 \text{ and } S(j,i)=V(j,i).$$

8. The grouping method according to claim 6, wherein, for a pair of pieces of equipment Ei and Ej that are both incapable of receiving sound signals, the following applies:

$$S(i,j)=0 \text{ and } S(j,i)=0.$$

9. The grouping method according to claim 1, wherein it is determined that the piece of equipment Ei recognizes the piece of equipment Ej, and thus that the pieces of equipment Ei and Ej belong to a common primary group, when:

$$S(i,j)>Sr,$$

where Sr is a predetermined recognition threshold and S(i, j) is the mutual recognition level.

10. The grouping method according to claim 9, wherein, within the common primary group, it is considered that a recognition link l(i, j) exists between two pieces of equipment Ei and Ej when the piece of equipment Ei recognizes the piece of equipment Ej, and wherein it is considered that the primary group is a finalized group and corresponds to the common sound space when the number of recognition links existing in the primary group is equal to a maximum number of links Lmax such that:

$$L\max=(n-ns)\times(n1),$$

where n is the number of pieces of equipment in the primary group and where ns is the number of pieces of equipment among the n pieces that are incapable of receiving sound signals.

11. The grouping method according to claim 10, comprising the step, when the number of recognition links existing in the primary group is less than the maximum number of links Lmax, of presenting the primary group to a user and of requesting the user to decide whether or not the primary group is a finalized group.

12. The grouping method according to claim 10, comprising the step, when the number of recognition links existing in the primary group is less than the maximum number of links Lmax, of comparing the number of existing links with a predetermined link threshold, and of considering that the primary group is a finalized group if the number of existing recognition links is greater than or equal to the predetermined link threshold.

13. The grouping method according to claim 10, further comprising the step, when the number of recognition links existing in the primary group is less than the maximum number of links Lmax, of reiterating the operational stage while modifying the test sound signal and/or while modifying a method used for analyzing the test sound signal for the purpose of evaluating the recognition level of said test sound signal.

14. The grouping method according to claim 1, further comprising the step of allocating a particular function to the pieces of equipment that occupy the common sound space.

15. A piece of equipment including at least one processor component arranged to perform the operational stage of the grouping method according to claim 1.

16. The piece of equipment according to claim 15, comprising a piece of decoder equipment.

17. A non-transitory computer readable storage medium including instructions that cause the processor component of the piece of equipment according to claim 15 to execute the steps of the operational stage of the grouping method comprising the steps of:

emitting a test sound signal in succession by a speaker of each piece of equipment;

receiving the test sound signal by a microphone of each piece of equipment that is capable of receiving sound signals;

evaluating, by a decoder connected to the pieces of equipment via a network, a recognition level for said received test sound signal by each of the pieces of equipment that is capable of receiving sound signals;

for each pair of pieces of equipment Ei and Ej, evaluating, by the decoder, a mutual recognition level representative both of a recognition level N(i, j) for the piece of equipment Ei receiving a test sound signal emitted by the piece of equipment Ej, and also of a recognition level N(j, i) for the piece of equipment Ej receiving a test sound signal emitted by the piece of equipment Ei; and on the basis of the mutual recognition level, determining, by the decoder, whether or not the pieces of equipment Ei and Ej belong to a common sound space, without information related to positions of the pieces of equipment Ei and Ej; and grouping, by the decoder the pieces of equipment Ei and Ej if it is determined that the pieces of equipment Ei and Ej belong to the common sound space.

\* \* \* \* \*